Jan. 19, 1965  A. N. MEA  3,166,686
TUNING ATTACHMENT AND SYSTEM FOR MOTOR GENERATORS
Filed Oct. 1, 1959  2 Sheets-Sheet 1
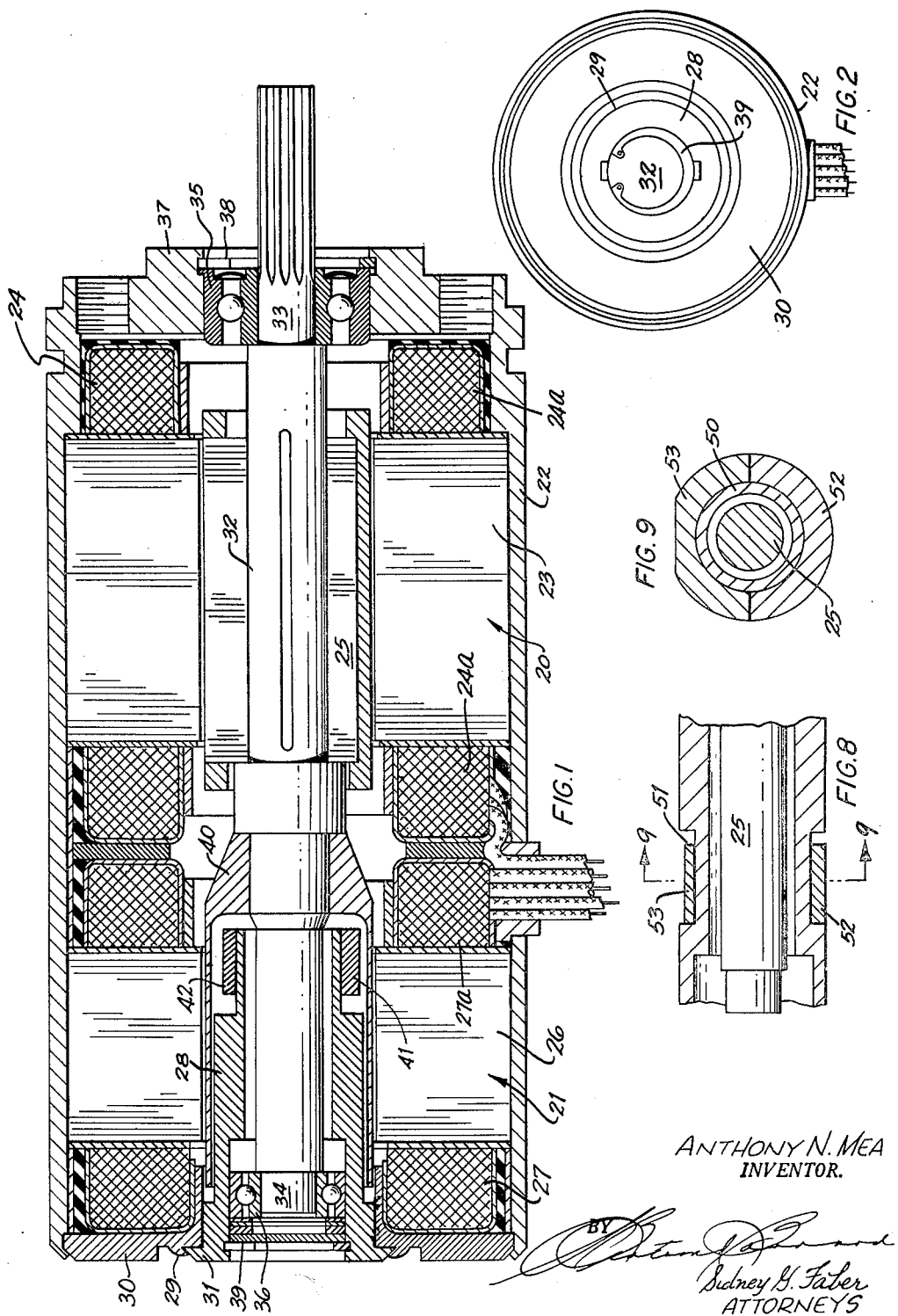
ANTHONY N. MEA
INVENTOR.
BY
Sidney G. Faber
ATTORNEYS

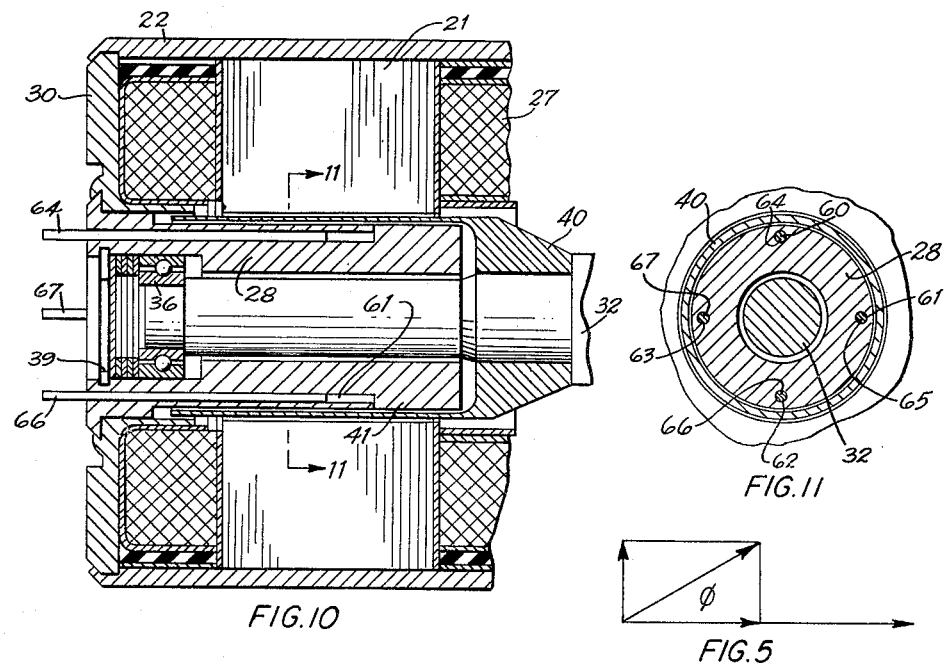
FIG.10
FIG.11
FIG.5
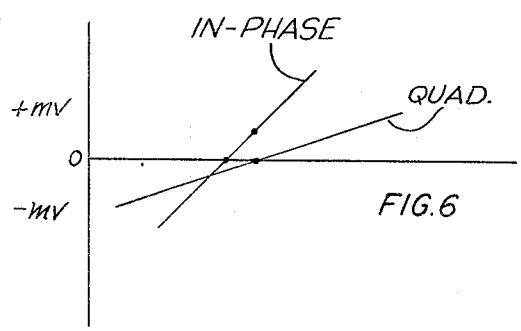
FIG.6
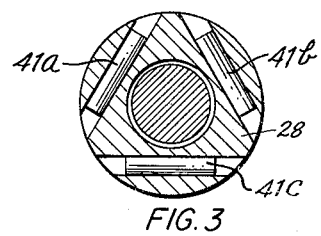
FIG.3
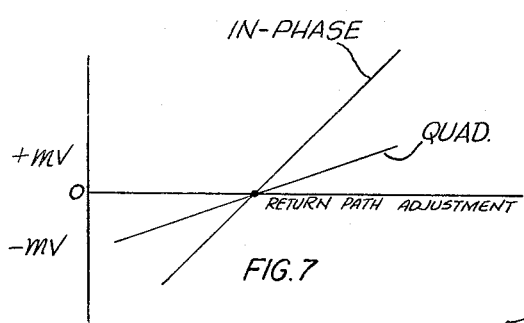
FIG.7
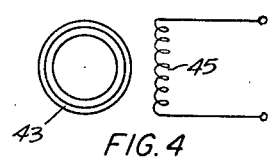
FIG.4
ANTHONY N. MEA
INVENTOR.
Sidney G. Faber
ATTORNEYS

United States Patent Office 3,166,686
Patented Jan. 19, 1965

3,166,686
TUNING ATTACHMENT AND SYSTEM FOR
MOTOR GENERATORS
Anthony N. Mea, New Providence, N.J., assignor to
General Precision, Inc., a corporation of Delaware
Filed Oct. 1, 1959, Ser. No. 843,826
17 Claims. (Cl. 310—168)

This invention relates to servo generators and more particularly relates to a servo generator which can have the output in-phase voltage component and output quadrature voltage component tuned substantially independently of one another to achieve a zero fundamental null voltage.

In the past it has been possible to tune either the in-phase component or the quadrature component of the output voltage to zero. For example, the flux path of the secondary portion of the generator magnetic circuit can be adjustably varied to vary the coupling between the primary flux and the output winding. However, because of electrical and magnetic imperfections which are unavoidable during manufacture, the in-phase component and the quadrature component go to zero at different points of adjustment. Therefore, the optimum fundamental null cannot be zero, but is some combination of the in-phase and quadrature voltage components.

This problem has been overcome in the past by providing in-phase or quadrature bucking windings on the generator stator. This solution has many drawbacks such as increasing the cost and size of the unit.

The principle of the present invention is to provide an adjusting means such as an adjustable conductive sleeve on the return magnetic path for tuning the quadrature voltage component, or by other suitable means of mounting, or support. The adjusting means is characterized in having an adjustable shorting or shading effect under the primary field poles. Thus, it will control the magnitude of the quadrature voltage substantially independently of the in-phase voltage.

In order to tune the generator, the return path member, with the tubular sleeve fitted thereto, is first adjusted by rotating the return path member until the in-phase voltage component is zero. The adjustable conductive means is then adjusted until the quadrature voltage is zero. Since the latter adjustment does not seriously affect the in-phase voltage adjustment, the generator output has a zero fundamental null voltage.

Due to the fact that adjustment of the quadrature voltage, by adjusting the adjustable conductive means, also affects the zero adjustment of the in-phase voltage to some extent, it is necessary to readjust the in-phase voltage to zero, and again adjust the quadrature voltage to conform to the zero in-phase voltage.

Under the circumstances, it is frequently necessary to repeat the adjustment procedure three or four times, until a final coordination of the zero point on both the in-phase and the quadrature voltage is obtained.

Accordingly, a primary object of this invention is to provide a novel generator having a zero fundamental null voltage.

Another object of this invention is to provide a servo generator having independent tuning means for tuning the output in-phase voltage and quadrature voltage components respectively.

A further object of this invention is to provide an adjusting means for the quadrature output voltage component of a generator which controls the shorting or shading effect under the field poles to tune the quadrature component substantially independently of the in-phase component.

Still another object of this invention is to provide a servo generator having an adjusting means for adjusting the return magnetic path to adjust the output in-phase voltage component and an independent conductive means which is adjustable with respect to the return path for adjusting the quadrature voltage component substantially independently of the in-phase voltage component.

These and other objects of my invention will become apparent from the following description taken in connection with the drawings in which:

FIGURE 1 shows a side cross-sectional view of a servo motor generator where the generator has the novel dual adjustment of the invention.

FIGURE 2 shows an end view of the motor generator of FIGURE 1 as seen from the left-hand side of FIGURE 1.

FIGURE 3 is a cross-section through a modification of the construction shown in FIGURES 1 and 2, illustrating how the return magnetic core of FIGURE 1 can be adjusted by angularly positioned tuning slugs for adjusting the in-phase voltage component.

FIGURE 4 is a schematic illustration of the generator portion of the motor generator of FIGURE 1.

FIGURE 5 shows a vector diagram of the output voltage of the generator of FIGURE 1.

FIGURE 6 shows the relationship between the in-phase and quadrature voltage components of FIGURE 4 for an adjustment of the magnetic return path of FIGURE 1.

FIGURE 7 is similar to FIGURE 6 and shows the manner in which the in-phase and quadrature voltage components can be independently turned to achieve a zero fundamental null voltage.

FIGURE 8 shows a third embodiment of the invention where the quadrature component is tuned by an axially movable conductive sleeve.

FIGURE 9 shows a cross-sectional view of FIGURE 8 taken across the lines 9—9, FIGURE 8.

FIGURE 10 shows a fourth embodiment of the invention where the in-phase component is tuned by a plurality of axially movable pins.

FIGURE 11 is a cross-sectional view of FIGURE 10, taken along lines 11—11, FIGURE 10.

Referring now to the drawings, FIGURES 1 and 2 show a first embodiment of the invention for a combined servo motor generator which includes a motor element 20 and a generator element 21 carried in a common housing 22. It will, however, be apparent that the invention may be applied to servo generators alone.

The motor element includes a stator core 23 with appropriate stator windings 24, 24a, and a rotor element 25. The generator element includes a stator core 26 with appropriate windings 27, 27a, to be described hereinafter with reference to FIGURE 4. The stator windings 24 and 27 may be held in position and insulated from the housing in any desired manner, as by a thermosetting plastic, such as the material commercially known as Araldite. A hollow cylindrical magnetic return path member 28 is concentrically positioned with respect to stator 26 and is rigidly held in position, after adjustment by staked-over section 29 of end cap 30 which locks flange 31 of return path member 28.

A shaft 32 common to motor element 20 and generator element 21 has two journals 33 and 34 which are supported in two anti-friction bearings 35 and 36 respectively. Bearing 35 is supported from end wall 37 while bearing 36 is supported from return path member 38, or by other suitable means of mounting or support. The bearings 35 and 36 are held in position by suitable snap ring assemblies 38 and 39 respectively. Common shaft 32 carries the rotor 25 of the motor and also has conductive rotatable cup 40, connected thereto. Cup 40 encompasses the return path member 28 as shown, and lies in the annular shaped area formed between the outer diameter of relatively stationary return path member 28 and the inner diameter of the stator 26. In order to adjust the return path position for adjusting the in-phase voltage null, the return path member 28 can be provided with a flat (not shown), or, as shown in FIGURE 3, the return path member 28 may have cylindrical slugs 41a, 41b and 41c inserted therein to control the reluctance of the magnetic circuit.

In this construction, the in-phase voltage is adjusted to zero by rotating the return path member with the axially movable rods in place, until a zero in-phase reading is obtained.

Here the adjustment of the quadrature voltage is effected by moving the slugs 41a, 41b, and 41c which also affects the zero reading of the in-phase voltage. The in-phase voltage may again be adjusted to a zero reading by rotating the return path member until a zero in-phase reading is reached.

The quadrature voltage is again adjusted by moving the slugs until a coordinated position of the zero reading of the in-phase and quadrature voltage components is reached.

Due to variations of the in-phase voltage while the quadrature voltage is being adjusted, it frequently requires three or four adjustments of both in-phase and quadrature voltage until a coordinated zero reading of both in-phase and quadrature voltage is reached.

In accordance with the present invention, the end of the return path member 28 which serves as a return path for the generator magnetic circuit has a tubular ring 41 fitted thereon of a highly conductive material such as copper or aluminum. However, it may be of a low resistivity ferrous material. Conductive ring or tubular sleeve 41 has a flat portion 42 thereon and tubular ring 41 is rotatable with respect to return path member 28. Adjustment of tubular ring 41 serves to tune the quadrature voltage component independently of the in-phase voltage component by changing the shading effect under the primary field poles formed by the field iron, and the tubular ring is thereafter rigidly secured in place with respect to return path member 28 as by an insulated set screw (not shown) or any other desired securing means.

In order to adjust the in-phase voltage, the entire return path 28, with the tubular sleeve or ring 41 fitted thereto, is rotated until a zero in-phase voltage reading, as shown in FIGURE 6, is reached.

After the in-phase voltage is at zero, the tubular ring 41 is rotated or moved longitudinally relative to the return path 28, and independently thereof, until the quadrature voltage is adjusted to zero.

If there is any disturbance of the zero reading of the in-phase voltage, by adjusting the tubular ring 41, the in-phase voltage is again adjusted by rotating the return path 28, until a zero in-phase reading is reached.

The tubular ring 41 is again adjusted by rotation or longitudinal movement, independently of the return path, until the quadrature voltage is at a zero reading, which may be aligned with the zero in-phase reading, as shown in FIGURE 7.

This stepped procedure is continued, if the in-phase zero voltage is disturbed by adjusting the tubular ring 41 until both the zero in-phase voltage and the zero quadrature voltage, are at precisely the same point as shown in FIGURE 7.

While the primary purpose of the adjustment of the tubular ring 41 is to adjust the quadrature voltage, it also has some effect on the in-phase voltage, the effect on the quadrature voltage, however, being considerably greater than the effect on the in-phase voltage.

The schematic circuit for the generator element 21 of FIGURE 1 is shown in FIGURE 4 and comprises a rotor 43 with the stator windings formed of the excitation winding 44 and output winding 45 in quadrature with excitation winding 44. The output voltage $V_o$ of quadrature winding 45 will include a first component $V_{in\text{-phase}}$ which is in phase with the excitation voltage and a component $V_{quad}$ which is in quadrature with the excitation voltage. When adjusting the rotor 43 so that there will be a minimum output voltage $V_o$ at some predetermined rotor position, it has been found that the in-phase component of the output voltage will go through zero at a different point than the quadrature component. Thus, as seen in FIGURE 6, as the return path for the magnetic flux is adjusted, as by rotating the return path 28, with the tubular ring 41 fitted thereto, and adjusting the longitudinal position of the tubular ring 41, or rotating the ring 41 relative to the return path member 28, as shown in FIGURE 1, the quadrature voltage and in-phase voltage do not go through zero at the same point of adjustment; although either could be made zero at different adjustments.

In accordance with the present invention, and as shown in FIGURE 7, the in-phase voltage component is first tuned as by rotating the return path 28 with the tubular ring 41 fitted thereto, as shown in FIGURE 1 until there is a zero in-phase voltage component at the desired angular position of shaft 32 and rotor 25 of FIGURE 1. The sleeve 41 of FIGURE 1 is then adjusted by rotating flat 42 with respect to return path member 28 whereby the quadrature component of the voltage is tuned independently of the in-phase component until the quadrature component goes through zero at the same point as does the in-phase component. Accordingly, both the voltage components will now go through zero simultaneously at a predetermined angular position of shaft 32 and rotor 25. The tubular ring 41 is then rigidly secured to return path member 28 and the return path member is inserted in its tested position and portion 29 of cap 30 is staked-over to secure return path member 28 in position.

FIGURE 1 shows the quadrature voltage adjusting means or tubular ring 41 as connected to the end of return path member 28 and as having a flat 42 rotatable with respect to return path member 28. However, the tubular ring 41 may be positioned at any point along the return path member 28 and may be axially movable with respect to return path member 28 for adjustment purposes. This type of quadrature adjustment is shown in FIGURES 8 and 9 which show a portion of a return path member 50 which is similar to return path member 28 and having an annular undercut 51 therein. An axially adjustable tubular ring comprised of two halves 52 and 53 is fitted into the undercut 51 and operates in the same manner as tubular ring 41 of FIGURE 1 for adjusting the quadrature voltage. In the case of FIGURES 8 and 9, however, the ring halves 52 and 53 are axially displaced until the desired quadrature voltage is achieved and the ring halves are then secured in any desired manner as by brazing, pinning, or other suitable means.

In the alternate construction, shown in FIGURE 3, the in-phase voltage is adjusted by rotating the return path with the slugs 41a, 41b, 41c fitted thereto, in substantially the manner hereinbefore described. When the in-phase voltage reaches a zero reading, the quadrature voltage is adjusted by varying the position of the slugs 41a, 41b, 41c, relative to the return path, until a zero quadrature voltage reading is obtained.

In some instances, the zero reading of the in-phase voltage is varied to some extent, in adjusting the quadrature voltage.

The in-phase voltage reading is then readjusted to zero in the manner hereinbefore described.

The quadrature voltage is then again adjusted to zero by repositioning the slugs 41a, 41b, 41c, to obtain a zero quadrature voltage reading which coincides with the zero in-phase voltage reading.

As the quadrature voltage adjustment is relatively small, the in-phase voltage variation which is smaller would be relatively slight.

If the zero points do not coincide, the in-phase and quadrature voltage may again be adjusted in the manner hereinbefore described until a coordinated zero reading of both in-phase and quadrature voltage is obtained.

For purposes of adjusting the in-phase voltage, the return path member 28 of FIGURE 1 may have a flat thereon, as discussed above in connection with FIGURE 1. As an alternative, FIGURES 10 and 11 illustrate the use of axially movable rods for tuning the quadrature voltage. In FIGURES 10 and 11, the generator structure of FIGURE 1 is repeated and the return path member 28 is shown as having four axially directed openings 60, 61, 62 and 63 therein. Rods 64, 65, 66 and 67 respectively are movably positioned in openings 60, 61, 62 and 63 and by appropriate positioning of the various rods, the magnetic return path may be adjusted and the rods 64 through 67 secured to obtain the zero quadrature component.

The in-phase voltage is adjusted to zero by rotating the return path member 28 with the axially movable rods 64 through 67 in place, until a zero in-phase reading is obtained.

The adjustment of the quadrature voltage is effected by moving the longitudinal rods, which also affects the zero reading of the in-phase voltage. The in-phase voltage may again be adjusted to a zero reading by rotating the return path member 28 until a zero in-phase reading is reached.

The quadrature voltage is again adjusted by moving the axially movable rods 64 through 67 until a coordinated position of the zero reading of the in-phase and quadrature voltage components is reached.

In order to enable a complete understanding of the present invention, numerous specific examples are set forth. It is understood, however, that the invention is not limited thereto, and such modifications and variations as are embraced by the spirit and scope of the appended claims are contemplated as being within purview of the present invention.

What is claimed is:

1. In a servo generator; said servo generator including an output winding and a magnetic circuit for said output winding; said magnetic circuit including a magnetic return path member; means whereby the magnetic characteristics of said return path member are adjustable with respect to said magnetic circuit; said output winding having an output voltage induced therein responsive to flux changes in said magnetic circuit; said output voltages including a first and second component in quadrature with one another; an adjusting means including conductive means operatively associated with said return path member; adjustment of said adjusting means controlling said second component of voltage independently of said first voltage component; said adjusting means being operable to reduce said second voltage component to substantially zero while said first component of voltage is substantially zero to impart a substantially zero fundamental null to said servo generator, said adjusting means comprising a tubular conductive ring movable with respect to said magnetic return path member for adjusting said second voltage component.

2. A servo generator as in claim 1; said tubular conductive ring having a flat on the circumferential outer surface thereof; said tubular conductive ring being angularly adjustable with respect to said magnetic return path member.

3. A servo generator as in claim 1; said adjusting means comprising a tubular conductive ring operable to adjust the shading effect under the poles of said magnetic circuit.

4. A servo generator as in claim 1; said tubular conductive ring being longitudinally adjustable with respect to said magnetic return path member.

5. A servo generator as in claim 1; said magnetic return path member including a relatively movable element for varying the magnetic characteristics of said return path member.

6. In a generator comprising a stator, a rotor, an excitation stator winding, an output stator winding, and a magnetic circuit for coupling said excitation winding and said stator winding; said magnetic circuit including a return path member coaxially positioned with respect to said rotor; said output winding having an output voltage induced therein responsive to flux changes in said magnetic circuit; the magnitude of said output voltage depending upon the rotational angular position of said rotor; said output voltage including an in-phase component and a quadrature voltage component; said magnetic return path member being adjustable to adjust said output voltage independently of the angular position of said rotor; said in-phase voltage and said quadrature voltage components going through zero for different adjustments of said magnetic return path member; a quadrature voltage component adjusting means for adjusting said quadrature voltage component independently of said in-phase voltage, said conductive means comprising a tubular sleeve surrounding said return path member.

7. A generator as in claim 6; said tubular sleeve having a flat on the circumferential outer surface thereof; said tubular sleeve being rotatable with respect to said return path member.

8. A generator as in claim 6; said tubular sleeve being longitudinally adjustable with respect to said return path member.

9. In a generator comprising a stator, a rotor, an excitation stator winding, an output stator winding, and a magnetic circuit for coupling said excitation stator winding and said output stator winding; said magnetic circuit including a return path member coaxially positioned with respect to said rotor; said output stator winding having an output voltage induced therein responsive to flux changes in said magnetic circuit; the magnitude of said output voltage depending upon the rotational angular position of said rotor; said output voltage including an in-phase component and a quadrature voltage component; a quadrature voltage component adjusting means for adjusting said quadrature voltage component independently of said in-phase voltage and said quadrature voltage adjusting means including a conductive means operatively connected to said return path member and being adjustably positioned with respect thereto, said conductive means comprising a tubular sleeve surrounding said return path member.

10. A generator as in claim 9; said tubular sleeve having a flat thereon; said tubular sleeve being rotatable with respect to said return path member.

11. A generator as in claim 9; said tubular sleeve being longitudinally adjustable with respect to said return path member.

12. A servo generator as in claim 6; the magnetic return path being adjustable by movable slug means carried within said return path member.

13. A servo generator comprising a pair of stator windings being angularly displaced from each other, one of said windings being an input winding that is electrically energizable and the other being an output winding, said output winding having induced therein an in-phase voltage and a quadrature voltage, a movable member being variably positionable between said windings to vary the inductive coupling between the windings, a magnetic return path member in said magnetic path between said windings, said magnetic return path member being variably adjustable to vary the null of said in-phase component at said output winding, and an adjusting means operatively associated with said magnetic return path member for independently adjusting said quadrature component substantially independently of said in-phase component whereby sequential adjustment of said magnetic return path member and said independent adjusting means enables said in-phase null and said quadrature null to be established at the same rotary position of said movable member, said independent adjusting means comprising a tubular conductive member movable with respect to said magnetic return path member for adjusting said quadrature voltage component.

14. In the servo generator of claim 13, said adjusting means comprising a tubular conductive member that is unsymmetrical, said tubular member being rotatably angularly adjustable with respect to said magnetic return path member.

15. In the servo generator of claim 13, said independent adjusting means comprising a tubular member being longitudinally adjustable with respect to said magnetic return path member.

16. In the servo generator of claim 13, said independent adjusting means including a plurality of movable rods supported by said magnetic return path member, said rods being axially movable with respect to said magnetic return path member to vary said quadrature component.

17. In the servo generator of claim 13, said independent adjusting means comprising a plurality of slugs supported by said magnetic return path member, said slugs being movable transversely with respect to said magnetic return path member to vary the quadrature component.

References Cited by the Examiner
UNITED STATES PATENTS

| | | | |
|---|---|---|---|
| 2,671,179 | 3/54 | Blanchard | 310—191 X |
| 2,671,180 | 3/54 | Goldberg | 310—191 |
| 2,689,951 | 9/54 | Argentieri | 336—30 X |
| 2,694,797 | 11/54 | Lindblad | 310—191 X |
| 2,882,503 | 4/59 | Huff | 336—30 |
| 2,889,475 | 6/59 | Emerson | 310—184 |
| 2,898,486 | 8/59 | Sheldon | 310—191 X |
| 2,922,971 | 1/60 | Jeglum | 336—30 |
| 2,949,552 | 8/60 | Benoit | 310—191 X |

FOREIGN PATENTS 44,793  2/17  Sweden.

MILTON O. HIRSHFIELD, *Primary Examiner.*

ORIS L. RADER, *Examiner.*